United States Patent [19]
Napier

[11] 3,725,550
[45] Apr. 3, 1973

[54] PYRROLE DERIVATIVE FUNGICIDAL AGENTS AND TREATMENTS

[75] Inventor: Roger P. Napier, Bridgewater, Township, Somerset City, N.J.

[73] Assignee: Mobil Oil Corporation New York, N.Y.

[22] Filed: Dec. 15, 1970

[21] Appl. No.: 98,486

[52] U.S. Cl. ................................................ 424/274
[51] Int. Cl. ......................... A01n 9/22, A61k 27/00
[58] Field of Search ................. 424/274; 260/326.5 J

[56] References Cited

OTHER PUBLICATIONS

Feins et al., Justus Liebig Annalen Der Chemie 3/1969, Vol. 721, pp. 105-115
Randall et al., Abstract of Serial No. 62,242 filed 11/1948, published in 65 O.A. 115240 1154, on 1/1952.

Primary Examiner—Albert T. Meyers
Assistant Examiner—Donald B. Moyer
Attorney—Oswald G. Hayes, Andrew L. Gaboriault, Mitchel G. Condos and James F. Snowden

[57] ABSTRACT

Fungicides containing an N-alkyl-trichloroacetylpyrrole as the active component are highly effective in combating soil fungi, as exemplified by inhibiting the development of Pythium disease on cotton crops by pretreating soil with N-methyl-2-trichloroacetylpyrrole.

9 Claims, No Drawings

PYRROLE DERIVATIVE FUNGICIDAL AGENTS AND TREATMENTS

BACKGROUND OF THE INVENTION

1. Field of the Invention

This invention relates to novel fungicidal compositions and treatments, especially those involving certain substituted pyrroles as the active antifungal components.

2. Prior Art

In spite of the great amount of effort that has been expended on the protection of seeds and plants from attack by harmful fungi, there are still relatively few good soil fungicides available. One reason for this is that fungi themselves are low order plants and similar in many properties, reactions, and responses to the host seed or plant. Thus, materials applied to destroy fungi are likely to sometimes injure the host seed or plant. Some soil-borne fungi affect the growth of established plants and the control of such fungi is complicated by the effect of the antifungal agent upon the desirable plants.

N-methyl-2-trichloroacetylpyrrole and its preparation were recently described by A. Treins and F. H. Kreuzer in Justus Liebigs Ann. Chem. *1969*, 721, pp. 105–115 without any indication that the compound might have fungicidal properties or other utility for agricultural purposes.

SUMMARY OF THE INVENTION

The present invention relates to fungicidal compositions of matter which include a combination of at least one N-alkyltrichloroacetylpyrrole and carrier for the pyrrole compound as well as to methods of combating fungi which comprise contacting at least one soil fungus with such compositions of matter.

Narrower aspects of the invention are concerned with the preferred pyrrole derivatives which contain from one to 12 carbon atoms in the N-alkyl radical, and especially N-methyl-2-trichloro-acetylpyrrole, and also with the preferred method of inhibiting fungi which involves treating the soil prior to the sprouting of agricultural or horticultural plant seed in the soil.

DESCRIPTION OF SPECIFIC EMBODIMENTS

In addition to a conventional carrier material, the antifungal compositions of the present invention include an active antifungal component in the form of one or more N-alkyl-trichloroacetylpyrrole compounds. The preferred pyrrole derivatives may be represented by the type formula:

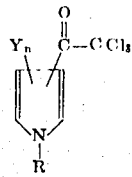

wherein R is an alkyl group containing from one to 12 carbon atoms, Y may represent one or more optional substituents as exemplified hereinafter and $n$ is an integer of from 0 to 3. Suitable derivatives of this nature include, inter alia, N-ethyl-3-trichloroacetylpyrrole, N-isopropyl-3-trichloroacetylpyrrole, N-(sec-butyl)-2-trichloroacetylpyrrole, N-heptyl-3-trichloroacetylpyrrole, N-(2-ethylhexyl)-2-trichloroacetylpyrrole and N-dodecyl-2-trichloroacetylpyrrole. N-methyl-2-trichloroacetylpyrrole is particularly preferred as the active ingredient in these compositions in view of the excellent results obtainable with this compound as described hereinafter.

In addition to haloacyl substituent each of the other nuclear carbon atoms in the pyrrole ring may optionally be substituted with one of a variety of atoms or radicals that do not lessen the antifungal characteristics of the compound. These substituents are designated by $Y_n$ in the foregoing formula and may include chlorine, bromine, iodine and fluorine atoms, nitro groups, as well as organic radicals represented by the formulas: —R, —$NR_2$, —COOR, —O—R, —S—R and —S—Ar, wherein R is an alkyl group containing from one to five carbon atoms (e.g., methyl, ethyl, isopropyl, sec-butyl, etc.), Ar denotes an aryl group (e.g., phenyl) and the R and Ar groups may as a general rule be either unsubstituted or contain substituents as, for example, halogen atoms or nitro groups. For example, a few of the many compounds with such substituents are 5-methyl-2-trichloroacetyl-N-methylpyrrole, 4-nitro-2-trichloroacetyl-N-methylpyrrole, 4-trifluoromethyl-2-trichloroacetyl-N-methylpyrrole and 3-chloro-2-trichloroacetyl-N-methylpyrrole. Compounds of the aforesaid type are effective agricultural fungicides against soil fungi. These pyrrole derivatives are applied as the toxic components in fungicidal compositions containing at least one such derivative and a carrier. In some instances, it may be desirable to incorporate two or more of these compounds in the fungicidal composition in order to achieve a broader spectrum of control.

The compositions can be applied as dusts, as liquid sprays, or as gas-propelled sprays and can contain, in addition to a carrier, additives such as emulsifying agents, wetting agents, binding agents, gases compressed to the liquid state, odorants, stabilizers, and the like. A wide variety of liquid and solid carriers can be used in the fungicidal compositions. A few examples of the many suitable liquid carriers are water; organic solvents such as alcohols, ketones, amides, and esters; mineral oils such as kerosene, light oils, and medium oils; and vegetable oils such as cottonseed oil. Examples of solid carriers include, inter alia, talc, bentonite, diatomaceous earth, pyrophyllite, fullers earth, gypsum, flours derived from cotton seeds and nut shells, and various natural and synthetic clays having a pH not exceeding about 9.5.

The amount of the pyrrole derivatives used in the fungicidal compositions may vary rather widely. It depends to some extent upon the type of composition on which the material is being used, the nature of the condition to be controlled, and the method of application. In the ultimate fungicidal composition, as applied in the field, fungicide concentrations as low as 0.0001 weight per cent of the total composition can be used. In general, compositions, as applied, containing about 0.005 weight percent (50 ppm.) fungicide in either liquid or solid carrier, give good results. In some cases, however, stronger dosages up to about 1 percent may be required.

In practice, fungicidal compositions are usually prepared in the form of concentrates, which are diluted in the field to the concentration desired for application.

For example, the concentrate can be a wettable powder containing large amounts of fungicide, a carrier (e.g., attapulgite or other clay), and wetting and dispersing agents. Such powders can be diluted prior to application by dispersing it in water to obtain a sprayable suspension containing the concentration of fungicide desired for application. Other concentrates can be solutions which will be later diluted, e.g., with kerosene. Thus, it is within the contemplation of this invention to provide fungicidal compositions containing up to about 80 percent, by weight of the composition, of fungicide. Accordingly, depending upon whether it is ready for application or it is in concentrated form, the contemplated fungicidal compositions contain between about 0.0001 percent and about 80 percent, by weight of the composition of at least one fungicidal pyrrole derivative and a carrier, liquid or solid, as defined hereinbefore.

The novel compositions may be distributed on seeds, plant shoots and roots, etc., by dusting them with a powder or spraying them with a liquid prior to planting them, and potatoes may be similarly protected to prevent sprouting. For most purposes, it is preferred to treat the soil prior to planting, but the soil may also be treated simultaneously with the seeding or thereafter, desirably before sprouting or any growth occurs. In general, treatments before emergence of the plant are most effective; however, it is possible to treat the soil around established plants to inhibit, or at least minimize, any further attack on the plant from soil-borne fungi, and this is useful in the protection of perennial plants.

Among the many varieties of plants that may be protected by these treatments are cotton, peanuts, soybeans, cucumbers, peas, various types of potatoes, yams, tobacco, tomatoes. Among the many varieties of seeds that may be protected are beans and corn, tomato, cucumber, wheat, rye, soybean, lettuce, squash and peanut seeds.

For a better understanding of the nature, objects and advantages of this invention, reference should be had to the following examples which are intended for purposes of illustration rather than as limitations on the scope of this invention. Unless otherwise specified, all proportions are set forth in terms of weight.

Example 1

In preparing the active component of the present fungicidal compositions, a somewhat higher reaction temperature is employed in the aforementioned method of Treins and Kreuzer. A solution of 45 g. of trichloroacetyl chloride in 150 ml. of chloroform is heated to the reflux temperature, and a solution of 20 g. of N-methylpyrrole in 150 ml. of chloroform is added dropwise over a period of 1 hour. Refluxing is continued for another half hour in a flask equipped with a reflux condenser; then the flow of cooling water through the condenser is shut off and the chloroform solvent is distilled out of the reaction mixture under atmospheric pressure. Finally, the residue in the flask is distilled 93° C. at an absolute pressure of 0.6 mm. of mercury in obtaining a yield of 42.9 g., or 75 percent of theory, of the product which is identified as N-methyl-2-trichloroacetylpyrrole.

In culturing the test organisms, four representative soil fungi, *Fusarium oxysporium*, *Pythium debaryanum*, *Rhizoctonia solani* and *Sclerotium rolfsii*, are maintained on potato dextrose agar in 20 × 150 mm. test tubes. Inoculum for the tests is increased in 1000 ml. Erlenmeyer flasks on 600 ml. of a mixture of 1 part by volume of corn meal and 3 parts of sand. This medium is saturated with water and sterilized by autoclaving at 15 lbs. psi. for 15 minutes on two successive days; then it is inoculated by transferring, asceptically, a small portion of mycelium from the test tube cultures 10–20 days prior to using for inoculum. One flask of the selected inoculum is sufficient to inoculate enough of a sterile mixture of equal volumes of soil and sand to fill 50 to 60 of the 3-inch pots used in the tests.

Each of two 3-inch plastic pots are filled with such a mixture of soil and sand after inoculation with the Pythium fungus. The fungicide is prepared by dissolving 16.7 mg. of the aforesaid pyrrole compound in a mixture of 3.33 ml. of acetone and 6.67 ml. of water. The inoculated soil-sand mixture is emptied from the two pots, and the 10 ml. of treating solution is added and thoroughly mixed therewith by means of a hand fork in producing a concentration of 25 parts per million (ppm.) of the pyrrole derivative in the treated test soil which is then replaced in the two pots, and 10 cotton seeds are planted in each of these pots. This treatment corresponds to an application rate of 5 pounds of the pyrrole compound per acre in field treatments. The pots are soaked with water and placed in the humidity chamber for 48 hours, and then transferred to a greenhouse for subsequent observation.

For purposes of evaluation of the efficiency of the aforesaid fungicide, four additional test pots are simultaneously prepared, planted with cotton seed and conditioned in the same manner, except that two of the pots are devoid of any antifungal agent in order to serve as a control and the soil in the other two test pots is treated with 25 ppm. of a well-known commercial fungicide, 1-chloro-2-nitropropane, to serve as a standard. Six days after planting of the seeds, the test pots are carefully inspected to ascertain the number of emergent plants therein for calculating the percent plant stand as a measure of the degree of activity or resistance against the Pythium disease; also an appearance or visual rating is assigned on the basis of the color and size of the plants as well as their apparent health or capability for continued growth. The following results are observed in this test.

| Fungicide | % Plant Stand | Appearance of Plants |
|---|---|---|
| None | 20 | Poor |
| Standard | 80 | Excellent |
| Pyrrole Derivative | 80 | Excellent |

EXAMPLE 2

The procedure of Example 1 is repeated in exact detail except for inoculating the test soil with the Fusarium fungus and employing pea seeds as the test specimens. The following results are obtained:

| Fungicide | % Plant Stand | Appearance of Plants |
|---|---|---|
| None | 40 | Poor |
| Standard | 70 | Excellent |
| Pyrrole Derivative | 70 | Excellent |

EXAMPLE 3

The procedure of Example 1 is again repeated with cucumber seeds as the test specimens planted in the soil-sand mixture after inoculation of the mixture with a combination of Rhizoctonia and Sclerotium damping-off organisms. The results observed in these tests are as follows:

| Fungicide | % Plant Stand | Appearance of Plants |
|---|---|---|
| None | 20 | Poor |
| Standard | 60 | Excellent |
| Pyrrole Derivative | 50 | Average |

EXAMPLE 4

In further trails of the pyrrole compound of Example 1 in lower concentration against the Pythium organism, the test procedure of that example is followed with minor modifications in utilizing a culture medium of 1 volume of corn meal to 5 of sand, different proportions of acetone and water as the carrier and a longer growth interval before inspection.

In this instance, 60 mg. of each test compound is dispersed in a solution of 5 ml. of acetone in 40 ml. of water. Fifteen ml. of each such formulation with a content of 20 mg. of the active agent is poured onto 1000 grams of the inoculated (Pythium fungus) soil-sand mixture and thoroughly mixed therewith to provide a treated soil with a 20 ppm. content of the active fungicidal agent which corresponds to 4 pounds per acre in large scale applications. Three 3-inch plastic pots are filled with a 1,000 gram batch of soil treated with the new fungicidal composition, 3 more with soil treated with the standard fungicide and another 3 control pots are filled with inoculated soil which contains no antifungal agent; then 10 cotton seeds (Deltapine variety) are planted in each of the nine pots prior to placing them in the humidity chamber. Observations are made 10 days after planting and set forth hereinafter for evaluating the effect of fungicides in comparison with the control as to both the appearance of the plants with careful attention to any fungal or phytotoxic effects and as to the percent plant stand which may also be termed "percent disease control."

PYTHIUM DISEASE ON COTTON

| Fungicide | % Plant Stand | Appearance Of Plants |
|---|---|---|
| None | 6 | Poor |
| Standard | 90 | Excellent |
| Pyrrole Derivative | 80 | Excellent |

EXAMPLE 5

In a repetition of Example 4, the following results are obtained:

PYTHIUM DISEASE ON COTTON

| Fungicide | % Plant Stand | Appearance Of Plants |
|---|---|---|
| None | 10 | Poor |
| Standard | 50 | Average |
| Pyrrole Derivative | 94 | Excellent |

EXAMPLE 6

The procedure of Example 4 is followed in all respects in utilizing the same treatments on soil mixtures inoculated with the Fusarium fungus and then planted with pea seeds. The observed results are:

FUSARIUM EFFECTS ON PEAS

| Fungicide | % Plant Stand | Appearance Of Plant |
|---|---|---|
| None | 47 | Poor |
| Standard | 90 | Average |
| Pyrrole Derivative | 87 | Excellent |

EXAMPLE 7

The treatment with the same pyrrole derivative is further evaluated as in Example 4 except for using sandy soil inoculated with "damping-off" organisms (Rhizoctonia/Sclerotium) and cucumber seeds in place of the Pythium fungus and cotton seeds in obtaining the following data.

DAMPING-OFF EFFECTS ON CUCUMBERS

| Fungicide | % Plant Stand | Appearance Of Plants |
|---|---|---|
| None | 13 | Poor |
| Standard | 90 | Excellent |
| Pyrrole Derivative | 80 | Excellent |

EXAMPLE 8

A field test is carried out under abnormally dry weather conditions in which an 18-inch strip of field soil is inoculated with damping-off rot organisms which include Rhizoctonia, Sclerotium and Pythium fungi to a depth of 4 inches and then treated to a similar depth with a dry/granular composition containing 10 percent of N-methyl-2-trichloroacetylpyrrole impregnated in 90 percent by weight of Attaclay of 30–60 mesh size. This fungicide is incorporated in the soil by means of a Gandy applicator and roto-tilling at a rate of 50 pounds total or 5 pounds of active ingredient per acre. Cotton seeds are planted 2 days after the fungicidal treatment about 3 inches apart along a 40-foot length of the strip which includes a section inoculated with the same organisms but not treated with any fungicide in order to serve as a control. Upon inspecting the test strip 13 days after the planting, it is observed that there is a 26.7 percent stand of healthy cotton plants in the control section, whereas there is a 48.1 percent stand of healthy plants in the treated section.

The foregoing examples clearly demonstrate that the compositions and treatments of this invention are highly effective against soil-borne fungi in general.

While the present invention has been illustrated by means of detailed examples of a limited number of compositions and treating methods for the purposes of full disclosure and to form a basis for valid comparisons, it will be readily apparent to those skilled in the art that many modifications and variations in both the compositions and methods may be employed within the scope of the disclosure herein. Accordingly, the present invention should not be construed as limited in any particulars, except as may be recited in the appended claims or required by the prior art.

I claim:

1. A fungicidal composition which comprises from about 0.0001 to 80 percent by weight of the composition of at least one N-alkyl-trichloroacetylpyrrole which contains from one to 12 carbon atoms in the N-alkyl radical, and a carrier selected from the group consisting of a solid carrier and a liquid carrier, said solid carrier selected from the group consisting of talc, bentonite, diatomaceous earth, pyrophyllite, fullers earth, gypsum, cottonseed flour and natural and synthetic clays having a pH of about 9.5 and said liquid carrier selected from the group consisting of water, alcohols, ketones, amides, esters, mineral oils and vegetable oils.

2. A composition according to claim 1 in which said alkyl radical is a methyl radical.

3. A composition according to claim 1 in which said pyrrole is N-methyl-2-trichloroacetylpyrrole.

4. A method of combatting soil fungi which comprises applying to said fungi an anti-fungal amount of at least one N-alkyl-trichloroacetylpyrrole which contains from one to 12 carbon atoms in the N-alkyl radical.

5. A method of combating soil fungi according to claim 4 in which said N-alkyl radical is a N-methyl radical.

6. A method of combating soil fungi according to claim 4 in which said pyrrole is N-methyl-2-trichloroacetylpyrrole.

7. A method of combating fungi which comprises treating soil prior to the sprouting of plant seed therein according to claim 4.

8. A method of combating fungi which comprises treating soil prior to the sprouting of plant seed therein according to claim 5.

9. A method of combating fungi which comprises treating soil prior to the sprouting of plant seed therein according to claim 6.

* * * * *